United States Patent
Yoder et al.

(10) Patent No.: US 10,352,619 B2
(45) Date of Patent: Jul. 16, 2019

(54) REFRACTORY ANCHOR ASSEMBLY AND METHOD FOR INSTALLING THE SAME

(71) Applicant: EXXONMOBIL RESEARCH AND ENGINEERING COMPANY, Annandale, NJ (US)

(72) Inventors: Patrick L. Yoder, Montgomery, TX (US); Christopher John Fowler, Houston, TX (US); Laura E Johnsen, Spring, TX (US); Vance A. McCray, Oakton, VA (US); Aaron M. Schlett, Conroe, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 15/964,473

(22) Filed: Apr. 27, 2018

(65) Prior Publication Data
US 2018/0320973 A1   Nov. 8, 2018

Related U.S. Application Data

(60) Provisional application No. 62/501,973, filed on May 5, 2017.

(51) Int. Cl.
  *F27D 1/14* (2006.01)
  *B01J 19/00* (2006.01)
(52) U.S. Cl.
  CPC .......... *F27D 1/141* (2013.01); *B01J 19/0053* (2013.01); *B01J 2219/00155* (2013.01); *B01J 2219/0218* (2013.01)

(58) Field of Classification Search
  CPC .................. F27D 1/141; B01J 19/0053; B01J 2219/0218; B01J 2219/00155
  See application file for complete search history.

(56) References Cited

U.S. PATENT DOCUMENTS

| | | | | |
|---|---|---|---|---|
| 2,079,872 A | * | 5/1937 | Quinn | C21C 5/4653 266/230 |
| 2,183,751 A | * | 12/1939 | McMahon | H01H 33/76 218/90 |
| 2,772,966 A | * | 12/1956 | Daniel, Jr. | C09F 1/04 106/236 |
| 2,951,929 A | * | 9/1960 | Fox | H05B 3/06 219/536 |
| 3,380,211 A | * | 4/1968 | Snellman | F23M 5/04 432/119 |

(Continued)

*Primary Examiner* — Jeanette E Chapman
(74) *Attorney, Agent, or Firm* — Glenn T. Barrett

(57) ABSTRACT

An anchor assembly for anchoring refractory materials within a vessel is disclosed that provides for a more reliable refractory anchor and resultant refractory lining system that is easier to install both in terms of the refractory lining and the anchor assembly itself when compared to prior art anchor assemblies. The anchor assembly includes a base pin assembly, and at least one anchor leg connected to and extending from the base pin assembly. The base pin assembly includes a mounting end formed on one end of the pin assembly adapted for securing the base pin assembly to the vessel. The mounting end has an electrical resistance contact point formed thereon. The electrical resistant contact point preferably has a flux material located thereon.

35 Claims, 6 Drawing Sheets

(56) References Cited

U.S. PATENT DOCUMENTS

| | | | |
|---|---|---|---|
| 3,540,713 A * | 11/1970 | Montgomery | B22D 41/02 |
| | | | 266/276 |
| 3,903,341 A | 9/1975 | Gerhold | |
| 4,660,343 A | 4/1987 | Raycher et al. | |
| 4,680,908 A | 7/1987 | Crowley | |
| 4,753,053 A | 6/1988 | Heard | |
| 6,393,789 B1 | 5/2002 | Lanclos | |
| 8,656,679 B1 | 2/2014 | Duhon | |
| 2016/0047124 A1 | 2/2016 | Garot et al. | |

\* cited by examiner

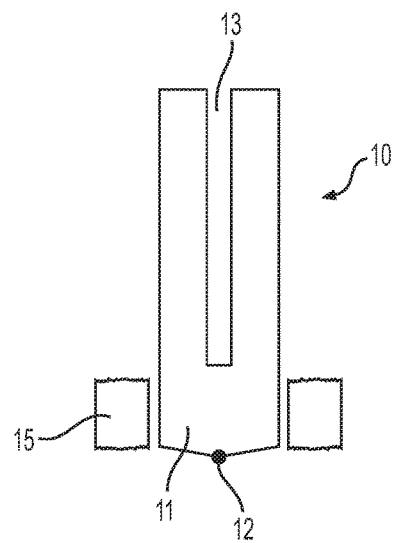
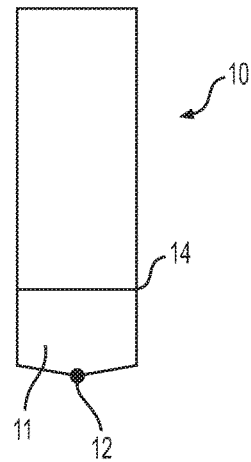
FIG. 1  FIG. 2
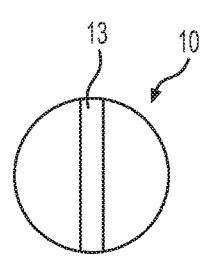
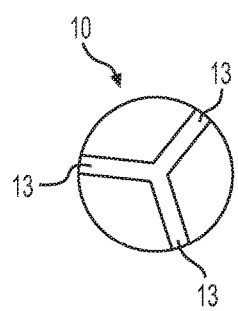
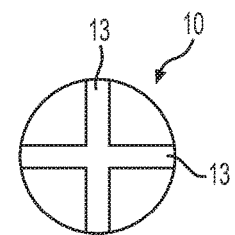
FIG. 3A  FIG. 3B  FIG. 3C

REFRACTORY ANCHOR ASSEMBLY AND METHOD FOR INSTALLING THE SAME

CROSS-REFERENCE TO RELATED APPLICATIONS

This application claims priority to U.S. Provisional Application Ser. No. 62/501,973 filed May 5, 2017, which is herein incorporated by reference in its entirety.

BACKGROUND

Field

The presently disclosed subject matter relates to an anchor assembly for securing a refractory lining to a vessel wall. In particular, the presently disclosed subject matter relates to a resistance weld refractory anchor assembly for use in anchoring a monolith refractory liner.

Description of Related Art

Refractory liners have been used for many years in process vessels, reactors, conduits, furnaces and the like to provide thermal insulation and in environments such as fluidized catalytic reactors, regenerators, or stacks, to provide resistance to abrasion and erosion, which are typically operated at elevated temperatures. Refractory liners not only serve to thermally insulate a vessel, but also prolong the useful life of the vessel by shielding it from erosion and abrasion. Over the years, various anchoring systems have been developed. Hexmetal is a honeycomb structure of anchoring suitable for internal components subject to constant heat soaking and for the internal curvature of certain geometric configurations such as pipes and cyclones. It is also used as a robust anchoring system in applications where traditional wire style anchors are not sufficient or reliable. Since the honeycomb structure is interlocking and is fabricated in large sheets, it limits how the refractory is installed and restricts the thickness that the refractory can affectively be applied with any reasonable quality. Cutting, fitting, and welding hexmetal is a time consuming and costly technique.

Single component anchoring systems have been developed as alternatives to hexmetal and are often referred to as "hexalt" anchor systems. These design replicate the hexmetal system as individual components at are install one at a time vs a full section of hexmetal. Some hexalt anchors include designs commonly referred to in the industry as Hexcells, S-Bars and K-Bars with a number of similar designs available on the market. These anchors are typically hand welded which is time consuming and costly and does not replicate the full advantage of hexmetal. Stud weld hexalt anchors have been developed but the design and application results in low quality welding or are complex and difficult to fabricate.

There is a need for an electrical resistance welded refractory anchor system that provides for a high quality and faster installing anchor system that can be used in place of traditional hexmetal anchoring.

SUMMARY

An anchor assembly for anchoring refractory materials within a vessel is disclosed in accordance with one aspect of the present invention. The advantage of this invention is that it provides for a more reliable refractory anchor and resultant refractory lining system that is easier to install both in terms of the refractory lining and the anchor assembly itself when compared to prior art anchor assemblies. The anchor system described here is easier to fabricate compared to similar technologies current available. The anchor assembly includes a base pin assembly, and at least one anchor leg connected to and extending from the base pin assembly. The base pin assembly includes a mounting end formed on one end of the pin assembly adapted for securing the base pin assembly to the vessel. The mounting end has an electrical resistance contact point formed thereon. The electrical resistant contact point preferably has a flux material located thereon.

Each anchor leg has a free end, a securing portion and at least one tab formed therein. The securing portion is adapted to connect the anchor leg to the base pin assembly. Each tab extends from the anchor leg at an angle with respect to the anchor leg. It is contemplated that the anchor assembly includes a plurality of anchor legs (e.g., two legs, three legs, four or more legs). The free end may extend at an angle with respect to the securing portion. Each anchor leg includes at least one opening formed therein. The opening being created when a corresponding tab is bent to extend from the anchor leg at the angle with respect to the free end. It is contemplated that the free end may extend at a first angle with respect to the securing portion and the tab may extend at a second angle with respect to the securing portion.

It is contemplated that the base pin assembly has at least one slot formed therein for receiving the securing portion of at least one anchor leg therein. Alternatively, securing portion of each of the at least one anchor leg is secured, for example by welding, to a portion of the base pin assembly. The base pin assembly may be formed from one of a carbon steel and an alloy steel. The base pin assembly has a first portion formed from a carbon steel and a second portion formed from an alloy steel. The first portion and the second portion are preferably welded together. The first portion and the second portion are preferably welded together by a bimetallic weld.

The anchor assembly further includes a ceramic ferrule extending around the mounting end of the pin assembly. The ceramic ferrule fits around the mounting end of the base pin assembly and is used to shroud the weld location for a higher quality weld.

A system for anchoring refractory materials to a vessel wall within a vessel is disclosed in accordance with another aspect of the present invention. The system includes a plurality of anchor assemblies arranged in an array. The plurality of anchor assemblies are secured to the vessel wall.

A method of mounting an anchor assembly for anchoring refractory materials to a vessel wall within a vessel is also disclosed. The method includes providing at least one anchor assembly. Each anchor assembly includes a base pin assembly, and at least one anchor leg connected to and extending from the base pin assembly. The base pin assembly has a mounting end formed on one end of the pin assembly adapted for securing the base pin assembly to the vessel. The mounting end has an electrical resistance contact point formed thereon. The method further includes locating the mounting end of the at least one anchor assembly on the vessel wall such that the electrical resistance contact point is contacting the vessel wall and securing the mounting end of the at least one anchor assembly on the vessel wall by welding the mounting end to the vessel wall using electrical resistance welding.

The accompanying drawings, which are incorporated in and constitute part of this specification, are included to illustrate and provide a further understanding of the disclosed subject matter. Together with the description, the drawings serve to explain the principles of the disclosed subject matter.

BRIEF DESCRIPTION OF THE DRAWINGS

FIG. 1 is a schematic view of a base pin assembly of the refractory anchor assembly in accordance with one aspect of the present invention;

FIG. 2 is a schematic view of another base pin assembly of the refractory anchor assembly in accordance with another aspect of the present invention;

FIG. 3A is a top view of the base pin assembly of FIG. 1;

FIG. 3B is a top view of the base pin assembly in accordance with another aspect of the present invention;

FIG. 3C is a top view of the base pin assembly in accordance with another aspect of the present invention;

DETAILED DESCRIPTION OF THE PREFERRED EMBODIMENT

Reference will now be made in detail to the various exemplary embodiments of the disclosed subject matter, exemplary embodiments of which are illustrated in the accompanying drawings. The structure and corresponding method of installation of the disclosed subject matter will be described in conjunction with the detailed description of the system.

Various aspects of the anchor assembly for use in securing a monolithic refractory lining in a vessel will now be described in greater detail with respect to the Figures.

Figure 8:
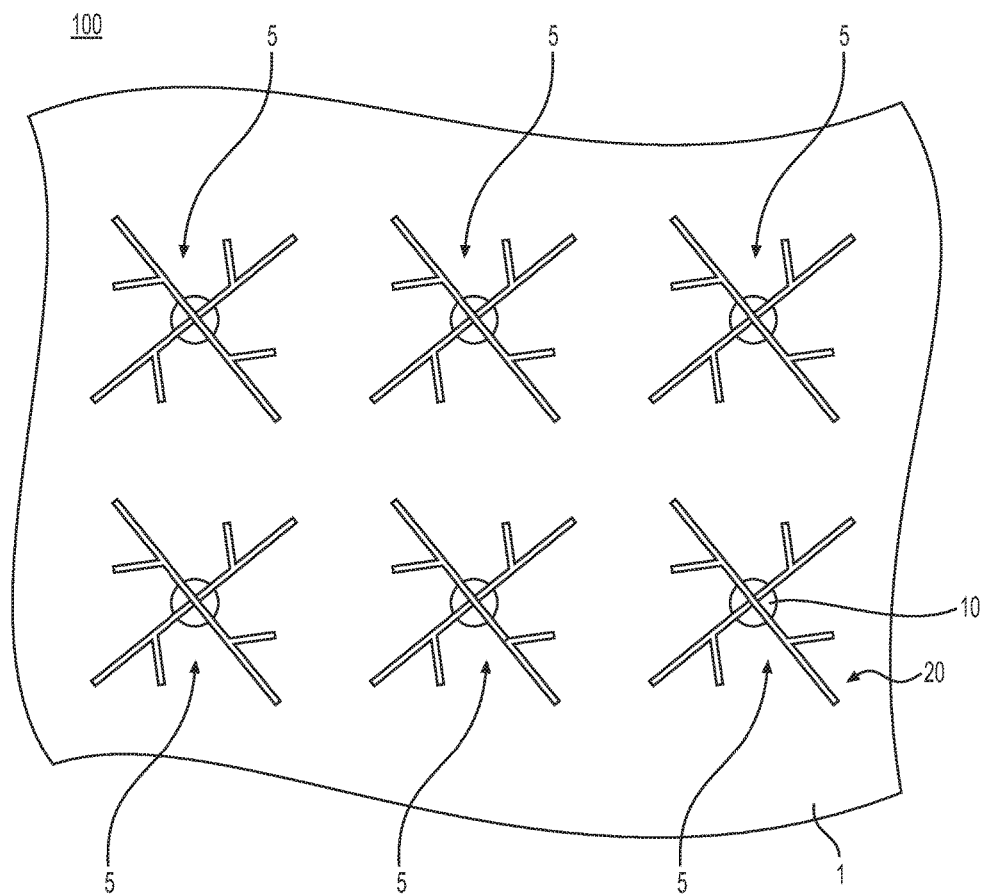
FIG. 8 is a schematic view of the system for anchoring refractory material in accordance with an aspect of the present invention.

Each anchor assembly includes a base pin assembly 10 and at least one anchor leg 20 secured to the base pin assembly. The at least one anchor leg 20 provides the supporting network for securing the monolithic refractory lining to the vessel wall. In accordance with one aspect of the presently disclosed subject matter, a plurality of anchor assemblies are utilized to form the supporting network for the refractory lining. One such arrangement is illustrated in FIG. 8, which is provided for illustrative purposes only. Adjacent anchor assemblies may contact each other or have varied orientation. It is contemplated that the orientation and arrangement of the anchor assemblies is chosen for best securing the refractory lining to the specific vessel configuration.

A base pin assembly 10 of the anchor assembly is illustrated in FIG. 1. The base pin assembly 10 includes a mounting end 11 formed on one end for securing the anchor assembly to the vessel. The mounting end 11 includes an electrical resistance contact point 12 containing a flux material. With such a configuration, the anchor assembly can be readily installed by electrical resistance (stud) welding. The base pin assembly 10 includes at least one slot 13 for securing at least one anchor leg therein, as will be described in greater detail below. FIGS. 3A, 3B, and 3C illustrate slot configurations for securing two, three or four anchor legs, respectively. It is contemplated that additional slots may be provided to secure additional anchor legs to the base pin assembly. Alternatively, it is contemplated that the base pin assembly may be formed without slots, as illustrated in FIG. 2. With such an arrangement, the at least one anchor leg is secured directed to the base pin assembly by welding.

The base pin assembly 10 is preferably formed from a metal rod. It is contemplated that the base pin assembly 10 may formed from a single metal rod that is formed from a suitable carbon steel or suitable alloy steel. It is also contemplated that the base pin assembly 10 may have a dual metal base formed from two materials, as illustrated in FIG. 2. The mounting end 11 is formed from a first metal and the opposing end of the base pin assembly is formed from a second metal. The first metal and the second metal are secured together by a bimetallic weld 14, illustrated in FIG. 2. The first metal is preferably a carbon steel, which is better suited for securing the anchoring assembly to the vessel. The second metal is preferably an alloy steel, which is better suited for attaching the at least one anchor leg to the base pin assembly. A dual metal design allows for similar weld materials and controls weld hardness when the base metal is different than the anchor leg. The dual metal base may also include at least one slot to secure anchor leg.

The base pin assembly 10 preferably includes a ceramic ferrule 15, which extends around the periphery of the mounting end 11. The ferrule 15 provides a shroud around the weld location for securing the base pin assembly 10 to the vessel wall. This results in a higher quality weld.

Figure 4A:
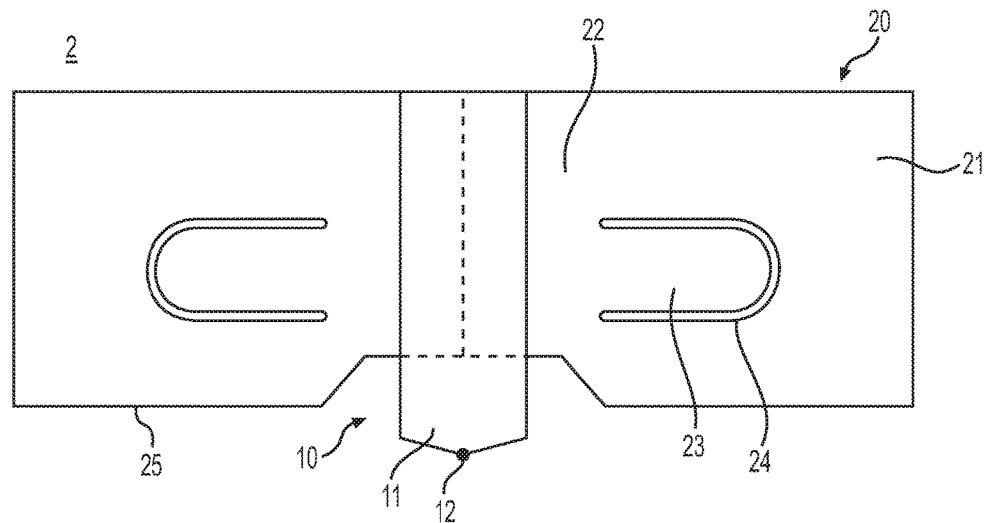
FIG. 4A is a schematic view of the refractory anchor assembly in accordance with aspect of the present invention.
Figure 6A:
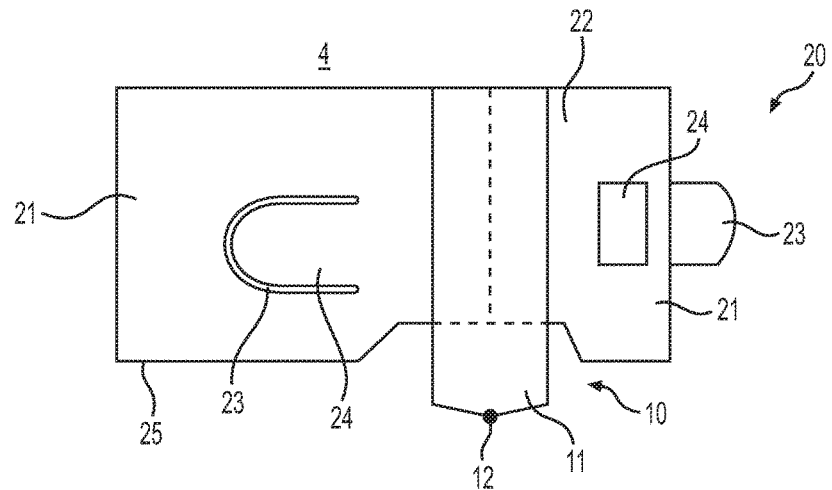
FIG. 6A is a schematic view of the refractory anchor assembly in accordance with yet another aspect of the present invention.
Figure 7A:
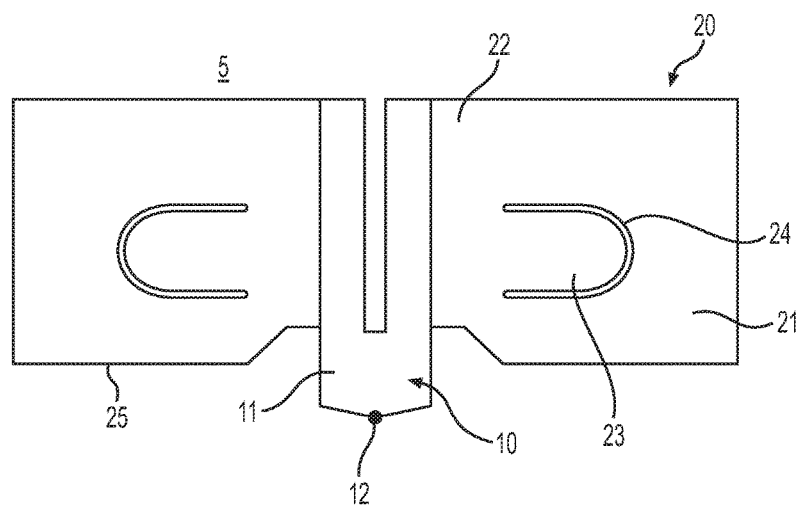
FIG. 7A is a schematic view of the refractory anchor assembly in accordance with yet another aspect of the present invention.

The base pin assembly 10 may be sized to receive the entire width of the at least one anchor, as illustrated in FIGS. 4A, 6A and 7A. It is also contemplated that the base pin assembly may have a reduced profile as illustrated in 5A where only a portion of the width of the at least one anchor leg is received therein.

The construction of the at least one anchor leg 20 will now be described in greater detail. Each anchor leg 20 includes a free end portion 21 and a securing portion 22. The securing portion 22 is configured to secure the anchor leg 20 to the base pin assembly 10. The securing portion 22 may be received within slot 13. Alternatively, the securing portion 22 may be welded directly to the base pin assembly 10. The free end portion 21 includes a tab 23 formed therein that extends from the free end portion at an angle, as illustrated in FIGS. 4B, 5B, 6B and 7B. The free end portion 21 also includes an opening 24. The free end portion 21, the tab 23 and the opening 24 provide surfaces and openings for engaging and receiving the material forming the refractory lining to secure the lining to the vessel wall. Each anchor leg 20 is preferably stamped from a metal plate. The tab 23 is preferably stamped at the same time. The opening 24 is formed when the tab 23 is bent at an angle with respect to the free end portion 21. As illustrated in FIGS. 4A, 5A, 6A and 7A, the mounting end 11 is spaced from a lower edge 25 of the anchor leg 20. When installed, a gap is formed between the lowed edge 25 and the vessel wall. This allows for the material formed the refractory lining to flow completely around the free end 21 of the anchor leg 20 to form a monolithic structure.

Figure 4B:
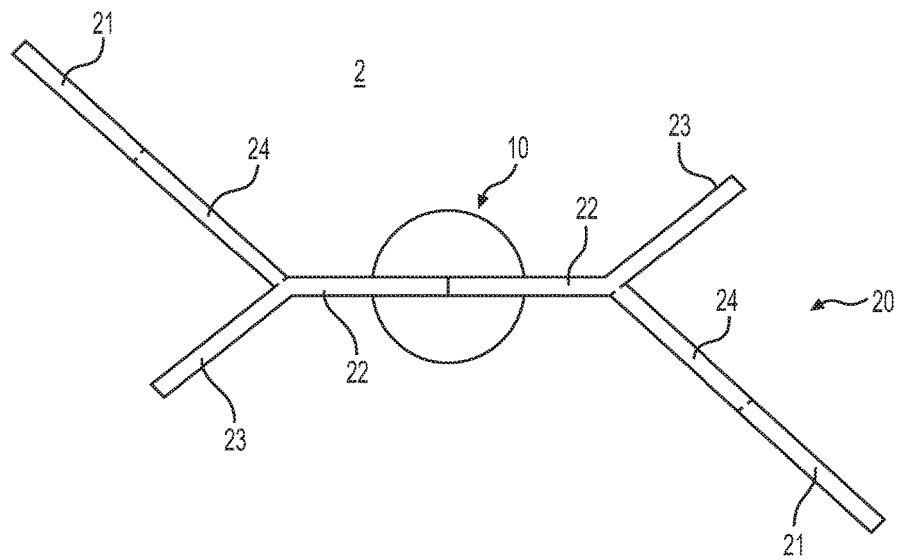
FIG. 4B is a top view of the refractory anchor assembly of FIG. 4A.
Figure 5A:
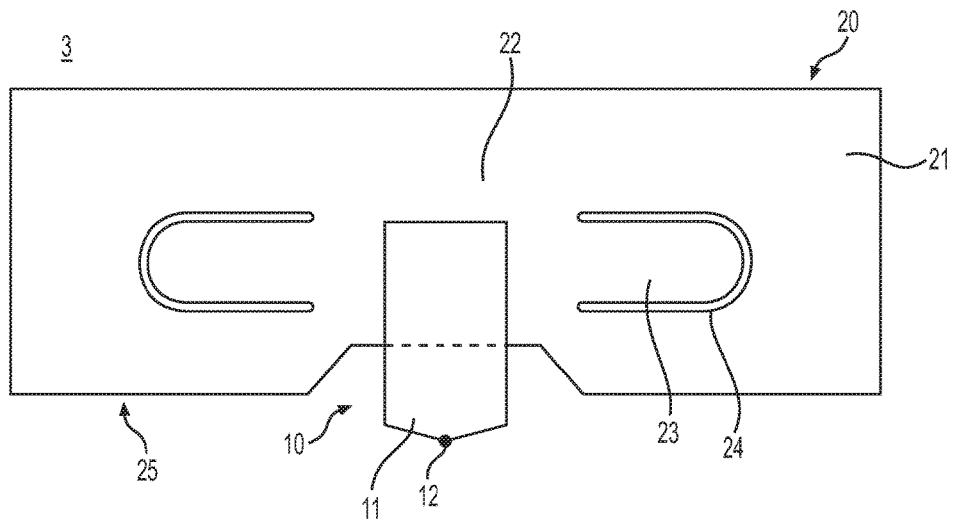
FIG. 5A is a schematic view of the refractory anchor in accordance with another aspect of the present invention.
Figure 5B:
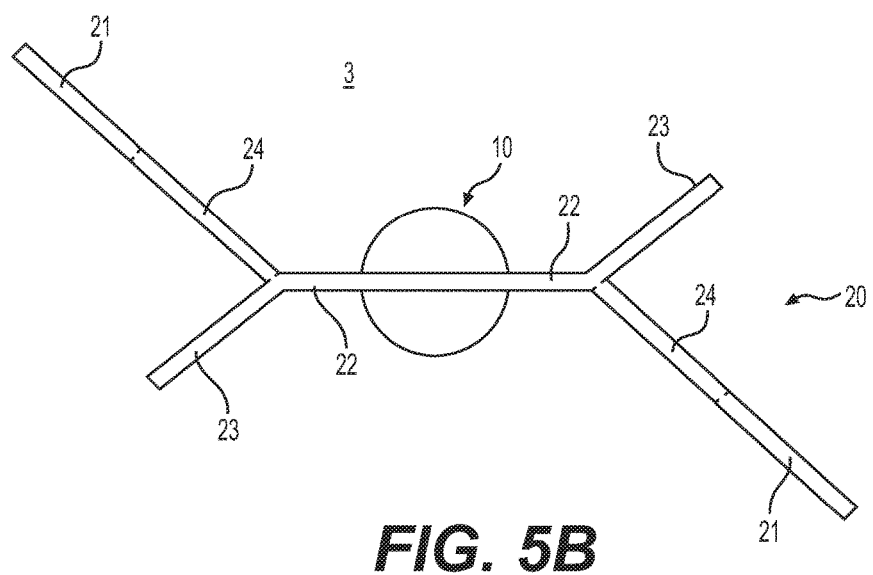
FIG. 5B is a top view of the refractory anchor assembly of FIG. 5A.

The free end portion 21 may extend at an angle with respect to the securing portion 22, as illustrated in FIGS. 4B and 5B. Alternatively, the free end portion 21 may extend in a planar relationship with respect to the securing portion, as illustrated in FIGS. 6B and 7B.

It is also contemplated that two anchor legs 20 may be formed as a single component, as illustrated in FIGS. 5A and 5B, with the two securing portions 22 forming a single component. With such an arrangement, a slot (not shown) may be provided to interlock with a complementary slot (not shown) on another component such four anchor legs 20 may be interconnected before being secured to a base pin assembly 10.

FIGS. 4A and 4B illustrate a two leg anchor assembly 2 having a base pin assembly 10 and a pair of anchor legs 20. FIGS. 5A and 5B illustrate a variation of the two leg anchor assembly 3 where the pair of anchor legs 20 are formed as a single component. In the arrangement illustrated in FIG. 5A, the base pin assembly 10 does not extend the entire width of the securing portion 22.

Figure 6B:
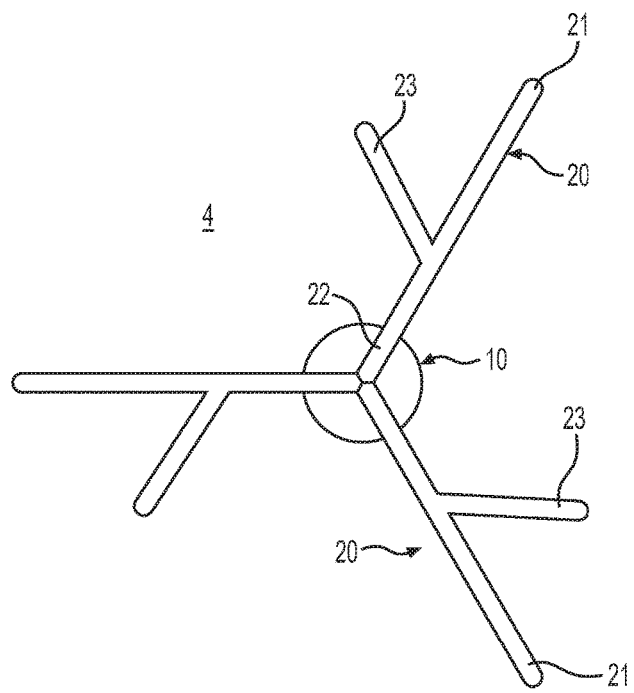
FIG. 6B is a top view of the refractory anchor assembly of FIG. 6A.
Figure 7B:
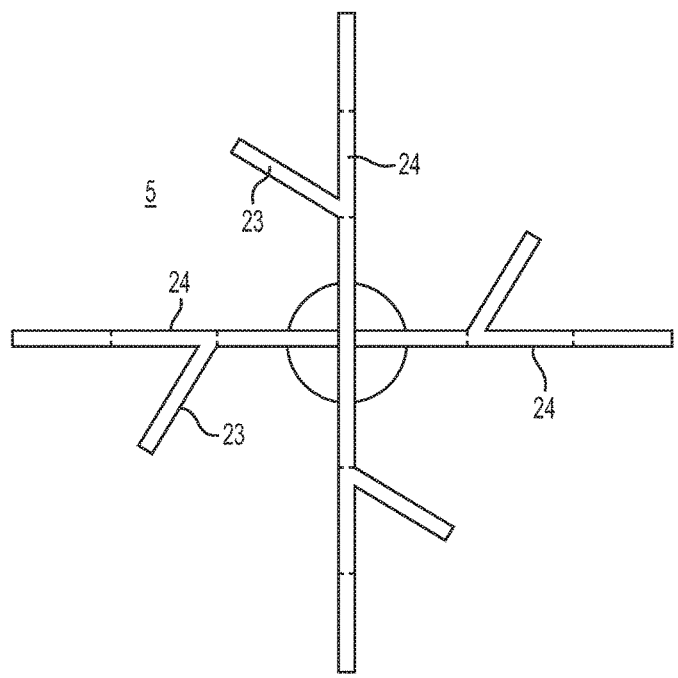
FIG. 7B is a top view of the refractory anchor assembly of FIG. 7A.

FIGS. 6A and 6B illustrate a three leg anchor assembly 4 having a base pin assembly 10 and three anchor legs 20.

FIGS. 7A and 7B illustrate a four leg anchor assembly 5 having a base pin assembly 10 and four anchor legs 20.

The anchor assemblies in accordance with the presently disclosed subject matter are easier to fabricate than the prior art anchor assemblies because it uses standard low cost metal components including metal rod and sheet metal that is simply cut and stamped into the desired shape. The anchor legs 20 and the base pin assembly 10 are not assembled in the field, but rather in a controlled environment to produce a single high quality piece. The presently disclosed anchor assemblies can be fabricated from different metals types which allow for greater flexibility across wider technical demands compared to the conventional single metal component system.

A plurality of anchor assemblies can be installed on a vessel wall 1 to form a system 100 for anchoring refractory lining to the vessel. The individual anchor assemblies 2, 3, 4 or 5 can be arranged in a pattern to replicate the conventional hexmetal configuration for securing the refractory lining without the difficulties associated with the installation of the conventional hexmetal configuration. The anchor assemblies 2, 3, 4 or 5 can be positioned on the vessel wall such that mounting end 11 contacts the vessel wall. The ceramic ferrule shrouds the mounting end 11 such that mounting end 11 can be welded to the vessel wall in a clean environment for improved weldability using stud/electrical resistance welding.

Once the system 100 containing the plurality of anchor assemblies 2, 3, 4 or 5 are in place within the vessel, the refractory lining can be applied to the vessel wall. The refractory lining surrounds the exposed portion of the anchor assemblies to secure the monolith refractory lining to the vessel.

The advantage of this invention is that it provides for a more reliable refractory anchor and resultant refractory lining system that is easier to install both in terms of refractory and the anchor itself, especially compared to hexmetal. The anchor system described here is easier to fabricate compared to similar technologies current available.

The anchor design allows for a near replication of traditional hexmetal and is easier and faster to install. This alternative to hexmetal ("hexalt") anchor is designed to be installed by electrical resistance (stud) welding. It improves on current stud welding anchor technology.

Additional Embodiments

Additionally or alternatively, the invention can include one or more of the following embodiments.

Embodiment 1

An anchor assembly for anchoring refractory materials within a vessel is disclosed. The anchor assembly includes a base pin assembly, and at least one anchor leg connected to and extending from the base pin assembly. The base pin assembly has a mounting end formed on one end of the pin assembly adapted for securing the base pin assembly to the vessel. The mounting end has an electrical resistance contact point formed thereon.

Embodiment 2

The anchor assembly according to embodiment 1, wherein each of the at least one anchor leg having a free end, a securing portion and at least one tab formed therein, wherein the securing portion being adapted to connect the at least one anchor leg to the base pin assembly, wherein each of the at least one tab extends from the anchor leg at an angle with respect to the anchor leg.

Embodiment 3

The anchor assembly according to embodiments 1 or 2, wherein the at least one anchor leg includes a plurality of anchor legs.

Embodiment 4

The anchor assembly according to embodiment 2, wherein the free end extends at an angle with respect to the securing portion.

Embodiment 5

The anchor assembly according to any one of the previous embodiments, where each of the at least one anchor leg having at least one opening formed therein, wherein each of the at least one opening being created when a corresponding tab is bent to extend from the anchor leg at the angle with respect to the free end.

Embodiment 6

The anchor assembly according to embodiment 5, wherein the free end extends at a first angle with respect to the securing portion and the tab extends at a second angle with respect to the securing portion.

Embodiment 7

The anchor assembly according to anyone of the previous embodiment, wherein the at least one anchor leg includes a plurality of anchor legs.

Embodiment 8

The anchor assembly according to anyone of the previous embodiments, wherein the base pin assembly having at least one slot formed therein for receiving the securing portion of the at least one anchor leg therein.

Embodiment 9

The anchor assembly according to anyone of the previous embodiments 1-7, wherein the securing portion of each of the at least one anchor leg is secured to a portion of the base pin assembly.

Embodiment 10

The anchor assembly according to embodiment 9, wherein the securing portion is welded to the base pin assembly.

Embodiment 11

The anchor assembly according to any one of the previous embodiments, wherein the electrical resistant contact point having a flux material located thereon.

Embodiment 12

The anchor assembly according to any one of the previous embodiments, wherein the base pin assembly is formed from one of a carbon steel and an alloy steel.

Embodiment 13

The anchor assembly according to any one of the previous embodiments 1-11, wherein the base pin assembly has a first portion formed from a carbon steel and a second portion formed from an alloy steel, wherein the first portion and the second portion are welded together.

Embodiment 14

The anchor assembly according to embodiment 13, wherein the first portion and the second portion are welded together by a bimetallic weld.

Embodiment 15

The anchor assembly according to embodiment 13, wherein the mounting end being located on the first portion.

Embodiment 16

The anchor assembly according anyone of the previous embodiments, further including a ceramic ferrule extending around the mounting end of the pin assembly.

Embodiment 17

A system for anchoring refractory materials to a vessel wall within a vessel is disclosed. The system includes a plurality of anchor assemblies according to anyone of the previous embodiments arranged in an array. The plurality of anchor assemblies are secured to the vessel wall.

Embodiment 18

A method of mounting an anchor assembly for anchoring refractory materials to a vessel wall within a vessel. The method includes providing at least one anchor assembly in accordance with anyone of the embodiments 1-16, locating the mounting end of the at least one anchor assembly on the vessel wall such that the electrical resistance contact point is contacting the vessel wall, and securing the mounting end of the at least one anchor assembly on the vessel wall by welding the mounting end to the vessel wall using electrical resistance welding.

Embodiment 19

The method according to embodiment 18, wherein the at least one anchor assembly includes a ceramic ferrule extending around the mounting end of the pin assembly, wherein locating the mounting end of the at least one anchor assembly on the vessel wall includes locating the ceramic ferrule such ceramic ferrule extends around a perimeter of a contact point between that the electrical resistance contact point and the vessel wall.

While the disclosed subject matter is described herein in terms of certain preferred embodiments, those skilled in the art will recognize that various modifications and improvements can be made to the disclosed subject matter without departing from the scope thereof. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. An anchor assembly for anchoring refractory materials within a vessel, the anchor assembly comprising:
   a base pin assembly; and
   at least one anchor leg connected to and extending from the base pin assembly,
   wherein the base pin assembly having a mounting end formed on one end of the pin assembly adapted for securing the base pin assembly to the vessel, wherein the mounting end having an electrical resistance contact point formed thereon.

2. The anchor assembly according to claim 1, wherein each of the at least one anchor leg having a free end, a securing portion and at least one tab formed therein, wherein the securing portion being adapted to connect the at least one anchor leg to the base pin assembly, wherein each of the at least one tab extends from the anchor leg at an angle with respect to the anchor leg.

3. The anchor assembly according to claim 2, wherein the at least one anchor leg includes a plurality of anchor legs.

4. The anchor assembly according to claim 2, wherein the free end extends at an angle with respect to the securing portion.

5. The anchor assembly according to claim 2, where each of the at least one anchor leg having at least one opening formed therein, wherein each of the at least one opening being created when a corresponding tab is bent to extend from the anchor leg at the angle with respect to the free end.

6. The anchor assembly according to claim 5, wherein the free end extends at a first angle with respect to the securing portion and the tab extends at a second angle with respect to the securing portion.

7. The anchor assembly according to claim 6, wherein the at least one anchor leg includes a plurality of anchor legs.

8. The anchor assembly according to claim 2, wherein the base pin assembly having at least one slot formed therein for receiving the securing portion of the at least one anchor leg therein.

9. The anchor assembly according to claim 2, wherein the securing portion of each of the at least one anchor leg is secured to a portion of the base pin assembly.

10. The anchor assembly according to claim 9, wherein the securing portion is welded to the base pin assembly.

11. The anchor assembly according to claim 1, wherein the electrical resistant contact point having a flux material located thereon.

12. The anchor assembly according to claim 11, wherein the base pin assembly is formed from one of a carbon steel and an alloy steel.

13. The anchor assembly according to claim 11, wherein the base pin assembly has a first portion formed from a carbon steel and a second portion formed from an alloy steel, wherein the first portion and the second portion are welded together.

14. The anchor assembly according to claim 13, wherein the first portion and the second portion are welded together by a bimetallic weld.

15. The anchor assembly according to claim 13, wherein the mounting end being located on the first portion.

16. The anchor assembly according to claim 11, further comprising: a ceramic ferrule extending around the mounting end of the pin assembly.

17. A system for anchoring refractory materials to a vessel wall within a vessel, the system comprising:
a plurality of anchor assemblies arranged in an array, wherein the plurality of anchor assemblies are secured to the vessel wall, wherein each anchor assembly comprising:
a base pin assembly; and
at least one anchor leg connected to and extending from the base pin assembly,
wherein the base pin assembly having a mounting end formed on one end of the pin assembly adapted for securing the base pin assembly to the vessel, wherein the mounting end having an electrical resistance contact point formed thereon.

18. The system according to claim 17, wherein each of the at least one anchor leg having a free end, a securing portion and at least one tab formed therein, wherein the securing portion being adapted to connect the at least one anchor leg to the base pin assembly, wherein each of the at least one tab extends from the anchor leg at an angle with respect to the anchor leg.

19. The system according to claim 18, wherein the at least one anchor leg includes a plurality of anchor legs.

20. The system according to claim 18, wherein the free end extends at an angle with respect to the securing portion.

21. The system according to claim 18, where each of the at least one anchor leg having at least one opening formed therein, wherein each of the at least one opening being created when a corresponding tab is bent to extend from the anchor leg at the angle with respect to the free end.

22. The system according to claim 21, wherein the free end extends at a first angle with respect to the securing portion and the tab extends at a second angle with respect to the securing portion.

23. The system according to claim 22, wherein the at least one anchor leg includes a plurality of anchor legs.

24. The system according to claim 18, wherein the base pin assembly having at least one slot formed therein for receiving the securing portion of the at least one anchor leg therein.

25. The system according to claim 18, wherein the securing portion of each of the at least one anchor leg is secured to a portion of the base pin assembly.

26. The system according to claim 25, wherein the securing portion is welded to the base pin assembly.

27. The system according to claim 17, wherein the electrical resistant contact point having a flux material located thereon.

28. The system according to claim 27, wherein the base pin assembly is formed from one of a carbon steel and an alloy steel.

29. The system according to claim 27, wherein the base pin assembly has a first portion formed from a carbon steel and a second portion formed from an alloy steel, wherein the first portion and the second portion are welded together.

30. The system according to claim 29, wherein the first portion and the second portion are welded together by a bimetallic weld.

31. The system according to claim 29, wherein the mounting end being located on the first portion.

32. The system according to claim 17, further comprising: a ceramic ferrule extending around the mounting end of the pin assembly.

33. A method of mounting an anchor assembly for anchoring refractory materials to a vessel wall within a vessel, the method comprising:
providing at least one anchor assembly, wherein each anchor assembly includes a base pin assembly, and at least one anchor leg connected to and extending from the base pin assembly, wherein the base pin assembly having a mounting end formed on one end of the pin assembly adapted for securing the base pin assembly to the vessel, wherein the mounting end having an electrical resistance contact point formed thereon;
locating the mounting end of the at least one anchor assembly on the vessel wall such that the electrical resistance contact point is contacting the vessel wall; and
securing the mounting end of the at least one anchor assembly on the vessel wall by welding the mounting end to the vessel wall using electrical resistance welding.

34. The method according to claim 33, wherein the electrical resistance contact point having a flux material located thereon.

35. The method according to claim 33, wherein the at least one anchor assembly includes a ceramic ferrule extending around the mounting end of the pin assembly, wherein locating the mounting end of the at least one anchor assembly on the vessel wall includes locating the ceramic ferrule such ceramic ferrule extends around a perimeter of a contact point between that the electrical resistance contact point and the vessel wall.

* * * * *